(12) United States Patent
Quinquis et al.

(10) Patent No.: US 6,392,995 B1
(45) Date of Patent: May 21, 2002

(54) LOCAL ACCESS NETWORK

(75) Inventors: Jean-Paul Quinquis; Olivier Roussel, both of Perros-Guirec; Laurent Hue, Lannion, all of (FR)

(73) Assignee: France Telecom S.A., Paris (FR)

( * ) Notice: Subject to any disclaimer, the term of this patent is extended or adjusted under 35 U.S.C. 154(b) by 0 days.

(21) Appl. No.: 08/871,274

(22) Filed: Jun. 9, 1997

(30) Foreign Application Priority Data

Jun. 20, 1996 (FR) .............................................. 96 07904

(51) Int. Cl.[7] .............................. H04J 1/16; H04J 3/16; H04J 12/28
(52) U.S. Cl. ..................... 370/235; 370/395.1; 370/434; 370/468
(58) Field of Search ................................. 370/232, 383, 370/235, 367, 391, 396, 398, 427, 252, 312, 434, 432, 331, 332, 333, 355, 497, 465, 468, 388; 455/436

(56) References Cited

U.S. PATENT DOCUMENTS

| | | | | |
|---|---|---|---|---|
| 4,475,192 A | * | 10/1984 | Fernow et al. ................. 370/94 |
| 4,788,680 A | * | 11/1988 | Kikuchi et al. ............... 370/68 |
| 5,179,556 A | * | 1/1993 | Turner ........................ 370/94.1 |
| 5,359,603 A | * | 10/1994 | McTiffin ...................... 370/395 |
| 5,363,369 A | * | 11/1994 | Hemmady et al. ............ 370/60 |
| 5,495,484 A | * | 2/1996 | Self et al. ................. 370/110.1 |
| 5,533,009 A | * | 7/1996 | Chen ........................... 370/17 |
| 5,633,861 A | * | 5/1997 | Hanson et al. ............... 370/232 |
| 5,638,371 A | * | 6/1997 | Raychaudhuri et al. ..... 430/347 |
| 5,701,292 A | * | 12/1997 | Chiussi et al. .............. 370/232 |
| 5,704,047 A | * | 12/1997 | Schneeberger ......... 395/200.65 |
| 5,706,279 A | * | 1/1998 | Teraslinna ................... 370/232 |
| 5,754,529 A | * | 5/1998 | Heiss .......................... 370/232 |
| 5,898,669 A | * | 4/1999 | Shimony et al. ............. 370/232 |
| 6,192,039 B1 | * | 2/2001 | Nishio et al. ................ 370/331 |

FOREIGN PATENT DOCUMENTS

EP   0679042 A2   10/1995

OTHER PUBLICATIONS

Requirement for Mobility Support in ATM, L. Van Hauwermeiren, et al, Alcatael Bell Research Center, pp. 1991–1995.
Connection Establishment over B–ISDN to Support Wireless PCN Handoff Processing, Oliver T.W.Yu, University of British Colombia, pp. 215–218.
Sesrch Report for FR9607904, Mar. 18, 1997.

* cited by examiner

*Primary Examiner*—Melvin Marcelo
*Assistant Examiner*—Chiho Andrew Lee
(74) *Attorney, Agent, or Firm*—Michael Best & Friedrich LLC; J. Warren Whitesel

(57) ABSTRACT

A local mobile access network is equipped to manage the resources in the network which comprises a number of radio terminals (BR) linked, via the concentration stages (CTR, VCX), to another concentration stage consisting of virtual circuit switches (VCX), At least the concentration stage includes a virtual circuit switch (VCX) equipped with macrodiversity management equipment (OPM). Each concentration stage (CTR, VCX) downstream from a concentration stage (CTR, VCX) is equipped with macrodiversity management equipment (OPM) is equipped with a flow rate management device (GDM) for managing the resources on the multiplex which is found directly upstream of the concentration stage that it equips.

11 Claims, 4 Drawing Sheets

LOCAL ACCESS NETWORK

The present invention concerns a local mobile access network equipped with means for managing the resources in said network.

Figure 1:
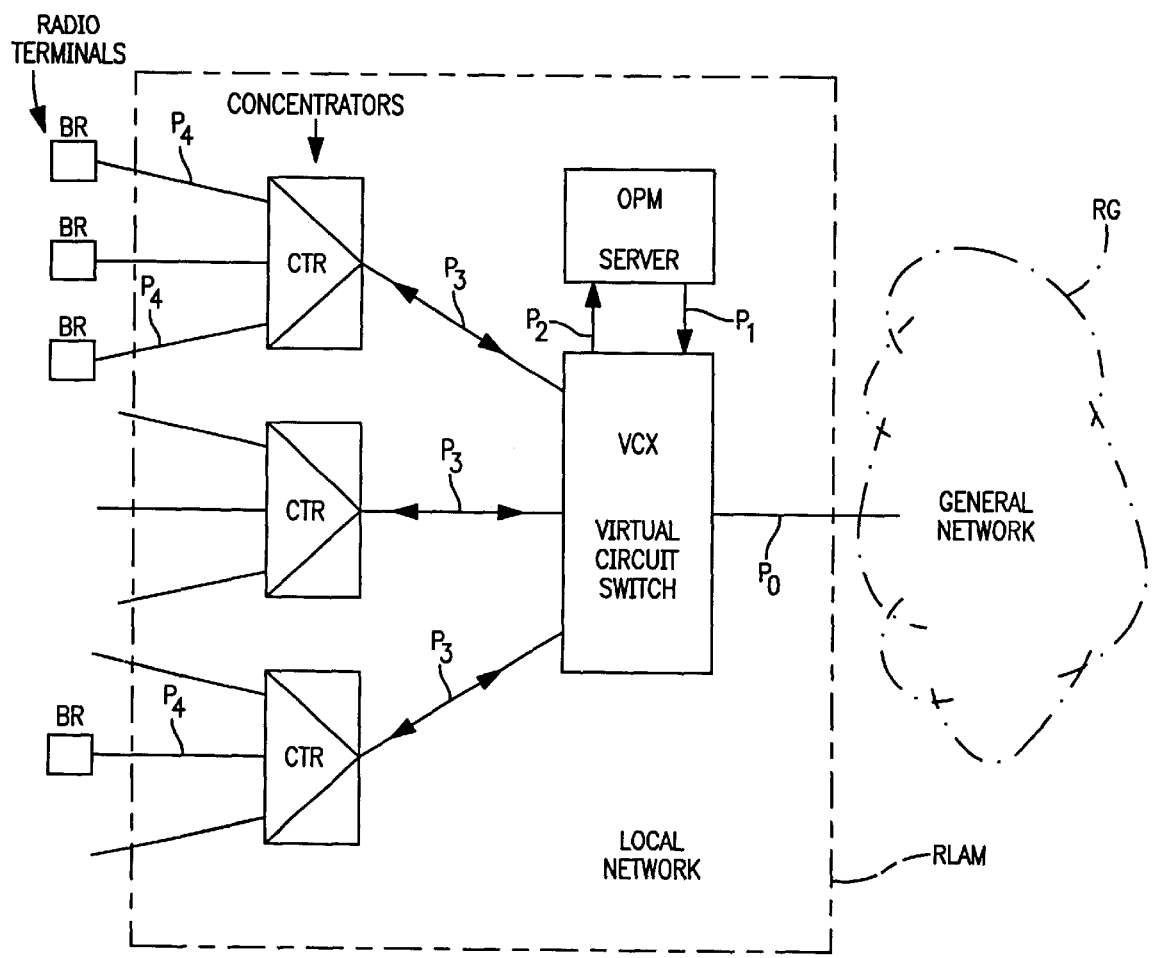

A local mobile access network RLAM to which the present invention can be applied is shown in FIG. 1. This local network consists of a number of radio terminals BR each connected, via a multiplex marked P4, to a number of concentrators CTR (three here). Each concentrator CTR is connected, by a multiplex marked P3, to a virtual circuit switch VCX which, in turn, is connected, by a multiplex marked P0, to a general network RG. Each element of the local network RLAM uses the technology known under the name ATM (Asynchronous Transfer Mode).

It will be noted that the multiplexes marked P4, P3 and P0 are bidirectional multiplexes.

With this type of access network, communications are managed in the switch circuit VCX. They can be local when they are established between mobile units linked to the local network RLAM in question. They can be outgoing when they are established between mobile units linked to the network RLAM in question and to any terminal equipment of the general network RG.

In the present description, we shall say that a mobile unit is linked to a local network RLAM when it passes under the radio coverage of one of the terminals BR connected to this network. By way of example, the coverage of such a network could be of an average agglomeration. Always by way of example, several networks of this type can be juxtaposed to increase the geographic area covered. Thus, a large-scale regional or national network should amalgamate a more or less significant number of local access networks RLAM.

It is understood that the present invention is not limited to an access network like the one shown in FIG. 1. It could be applied to a network having a more complex architecture because it consists of a number of more significant concentration and switching stages.

In the present description, we shall call the concentration stage and the virtual circuit switch(es) concentrators CTR of the network.

Moreover, in this description, the local networks will be considered to be both dedicated and shared. In both cases, the architectures are very similar, the only differences being in the fact that the second has terminal installations other than mobile.

A mobile unit which is already connected and which is thus linked to one of the terminals BR can, when it is shifted, find itself covered by a second or several other radio terminals BR. Thus, it can be momentarily linked to several terminals BR. It can then be said that this mobile unit is in a "hand-over" phase. In this phase, the information which it transmits is received simultaneously by the terminals BR to which it is linked and it, in turn, receives information coming simultaneously from said terminals BR.

The local mobile networks RLAM generally comprise macrodiversity server equipment OPM whose role is described in greater detail below. Equipment of this type is shown in FIG. 1 which is connected to the switch VCX by two multiplexes marked P1 and P2.

It will be noted that, contrary to the multiplexes P4, P3 and P0, the multiplexes P1 and P2 are unidirectional multiplexes. This is shown by the arrows for the unidirectional multiplexes which are, moreover, absent for the bidirectional multiplexes.

Figure 2A:
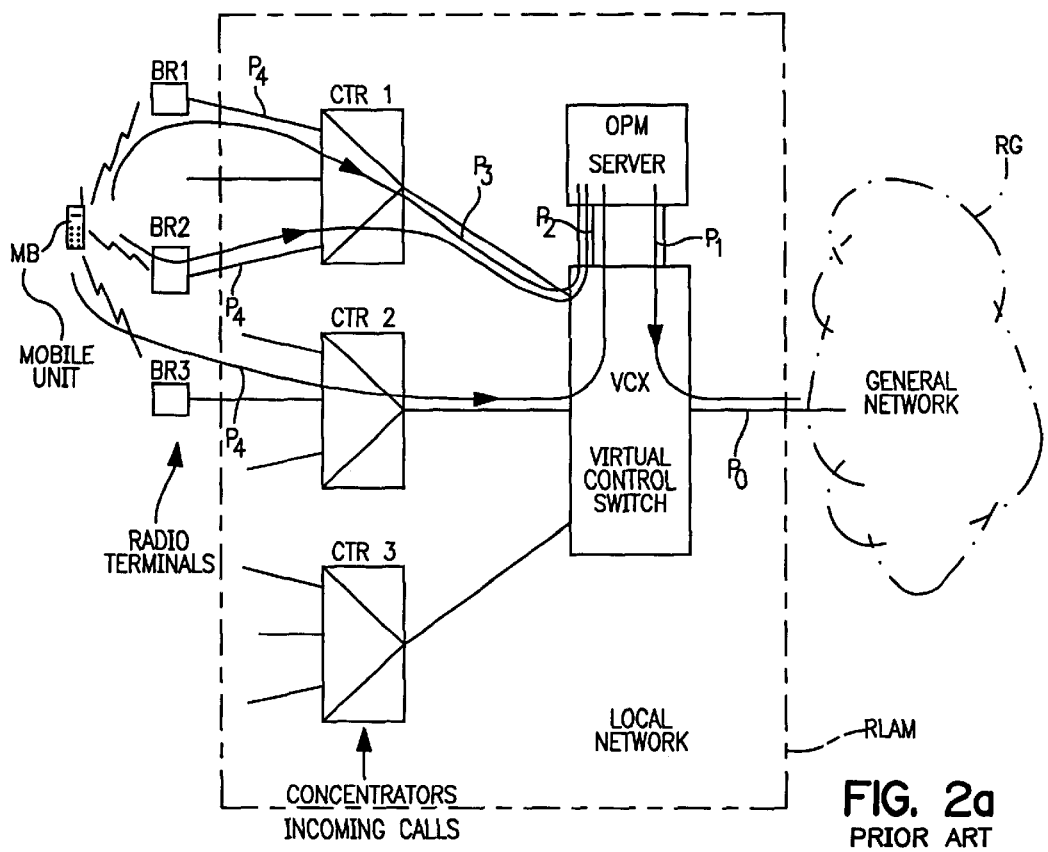

FIG. 2a shows, in the network RLAM shown in FIG. 1, the ascending direction (mobile to network) of a communication example during a hand-over phase. The mobile unit MB is linked to three terminals BR1, BR2 and BR3, two of which BR1 and BR2 are connected to the same concentrator CTR1 and the third BR3 to concentrator CTR2. In this ascending direction, the information transmitted by the mobile unit MB is then recopied three times in the local network RLAM. The flow is then multiplied by two on the multiplex P3 between concentrator CTR1 and switch VCX and it is multiplied by 3 on multiplex P2.

Generally, in the ascending direction, the mobile unit MB is linked to the local network RLAM as many times as there are terminals BR monitoring the mobile unit and the flow consumed in the network is increased to the different points of concentration.

From a general point of view, the function of the macrodiversity server equipment OPM is to filter the flow (here three) coming from the same mobile unit MB and present on the multiplex P2 and to retain only one, generally the one which has the best quality, that it delivers on the multiplex P1, in order to not unnecessarily "encumber" the network RLAM. This operation is generally called a "macrodiversity" operation.

It is specified that, when a mobile unit is covered by several terminals, the radio links are generally of a very unequal quality.

In FIG. 2a, on multiplex P1, the filtered flow is unique. In this FIG. 2a, an outgoing communication is considered even though the flow present on multiplex P1 is then found on multiplex P0. It will be noted that, in the case of a local communication, the flow on multiplex P1 is shunted, by switch VCX, toward the concentrator CTR with which the addressee is connected.

Figure 2B:
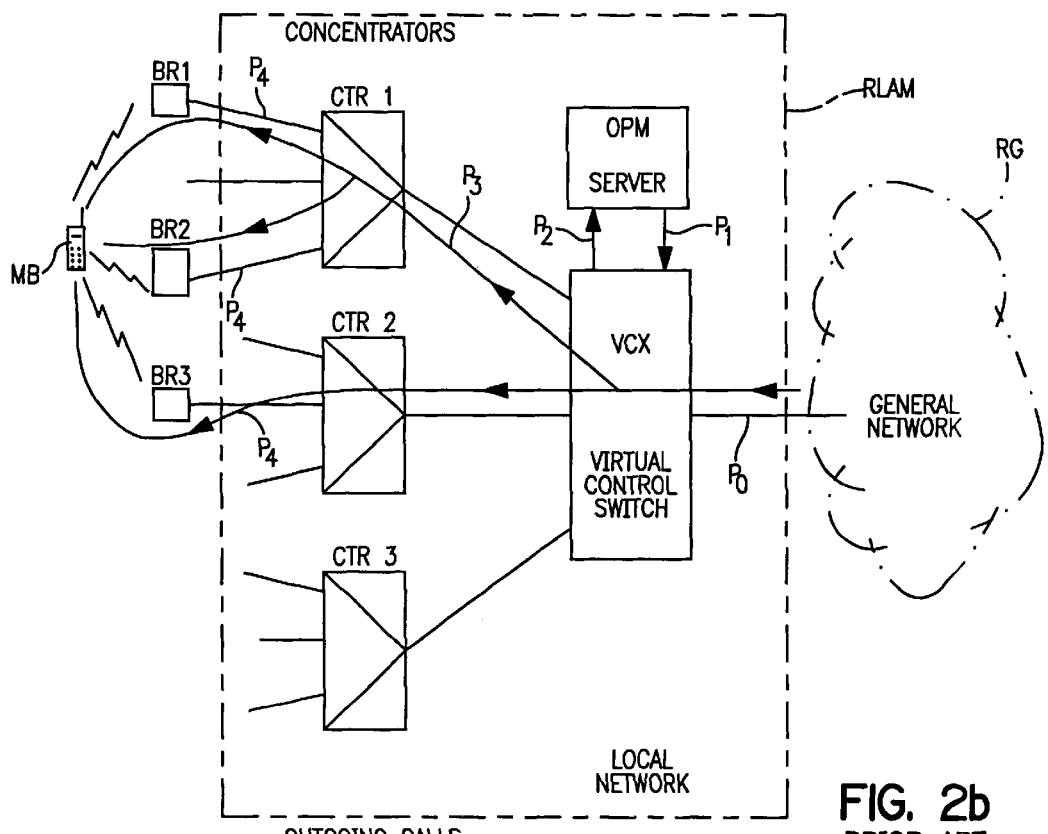

FIG. 2b shows the descending direction (network to mobile unit) of the information. The switch VCX transmits the signal to the two concentrators CTR1 and CTR2. The concentrator CTR1 transmits to the two terminals BR1 and BR2 while concentrator CTR2 transmits to terminal BR3. The same signal is then received three times by the mobile unit MB. More generally, the processing of the macrodiversity is carried out in the mobile unit MB itself and does not pose any specific problems at the level of the network RLAM. It will be noted that the descending connection is of the point-to-multipoint type.

In an ATM network, whatever it may be, a virtual connection is established by marking a path and requires the reservation of a passband on this path in accordance with the requirements expressed and required, by the caller at the time the connection is established, for the service performed on this path.

Although in the case of telephony, the resources consumed are limited to a few ten Kbits/s for a communication, in the case of videophony, on the other hand, the resources consumed attain several hundred Kbits/s, or even more.

Conventionally, an ATM multiplex supports a passband higher than 100 Mbits/s. Thus, at least at the level of the local part of the network, the number of connections for telephony simultaneously established will never permit this limit to be attained. That is not the case for videophony.

Henceforth, two factors should be taken into account which risk significantly increasing the flow rate and which require implementing methods which enable maximum management of the flow rates. On the one hand, the perspective of a future deployment on the radiotelephony networks for new services is inescapable. On the other hand, the macrodiversity which is a feature suitable for this type of network results in an increase of the flow rates during hand-over phases.

Therefore, the object of the invention is to propose a mobile access network which makes it possible to take into account the increase in the flow rate which results from hand-over phases.

To this end, a mobile access network of the type which generally comprises a number of radio terminals linked via concentration stages, to another concentration stage composed of a virtual circuit switch, is characterized therein that at least said concentration stage comprised of said virtual circuit switch is equipped with macrodiversity management equipment and therein that each concentration stage downstream from the or a concentration stage equipped with a macrodiversity management equipment is furnished with a management device for the flow rates provided to manage the resources on the multiplex which is located directly above the concentration stage which it supplies.

In the present description, it is considered that the links are called ascending when they originate with a radio terminal and terminate at the main virtual circuit switch of the network, while they are called descending in the other direction. Consequently, a concentration stage is downstream from a second one when it is situated between said second stage and a radio terminal and it is ascending from a second one when it is situated between said second stage and said virtual circuit switch of the network.

According to another feature of the invention, each management device controls the flow rate on the multiplex which is found directly above the concentration stage which it equips and, when said multiplex cannot support the required flow rate for a new connection of a hand-over phase communication, instructs said network not to establish said connection.

According to another feature of the invention, the receiving terminal under the coverage of which a mobile unit already connected comes to pass is provided for transmitting a connection request message which is transmitted to the management device which equips the concentration stage further downstream and said device, on receiving said message and when the multiplex which it controls can support the flow rate requested for said new connection, retransmits said message to the management device of the concentration stage directly above, this process being continued up to the management device of the concentration stage (CTR, VCX) furnished with macrodiversity management equipment and, when the multiplex which controls one of said management devices in question, cannot support the flow rate requested for said connection, said management device in question requests said network not to establish said connection.

According to another feature of the invention, the management device of the concentration stage which is equipped with macrodiversity server equipment, when the multiplex which it controls can support the flow rate requested for said new connection, transmits to the concentration stages downstream therefrom in direction of said receiving terminal, a new message for marking said new connection in said stages.

According to another feature of the invention, said message also contains a request for allocation of a flow rate.

According to another feature of the invention, the management device which equips the concentration stage and is also equipped with macrodiversity management equipment controls the flow rates on the multiplex which links said concentration stage to said macrodiversity management equipment.

According to another feature of the invention, each resource management device comprises a memory in which the value of the flow rate supported by the monitored multiplex is stored and updated.

According to another feature of the invention, the equipment for processing calls of said network participates in said updating of the memory of each resource management device.

According to another feature of the invention, each resource management device only monitors the flow rate of the multiplex in question in ascending direction.

Figure 3:
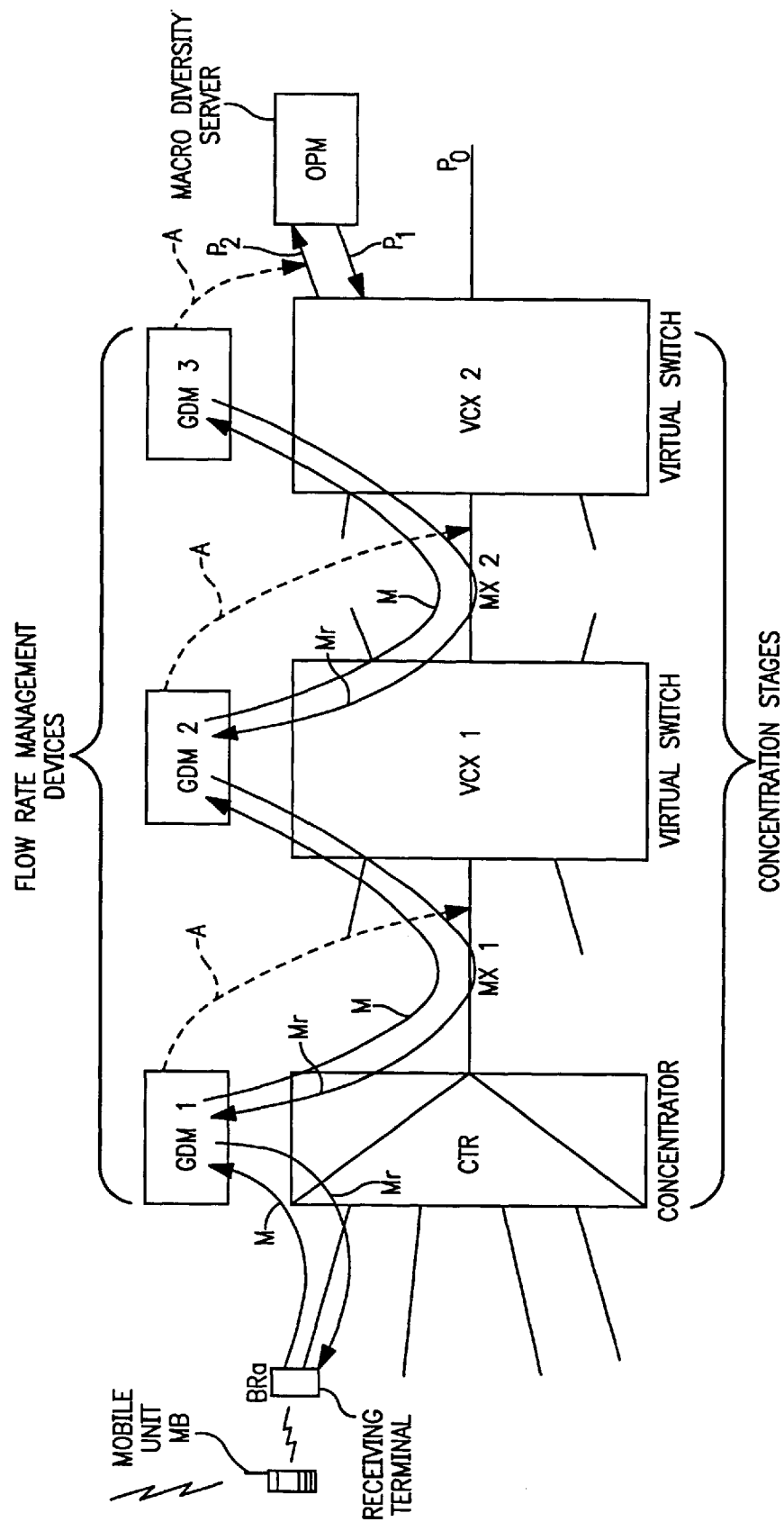
Figure 4:
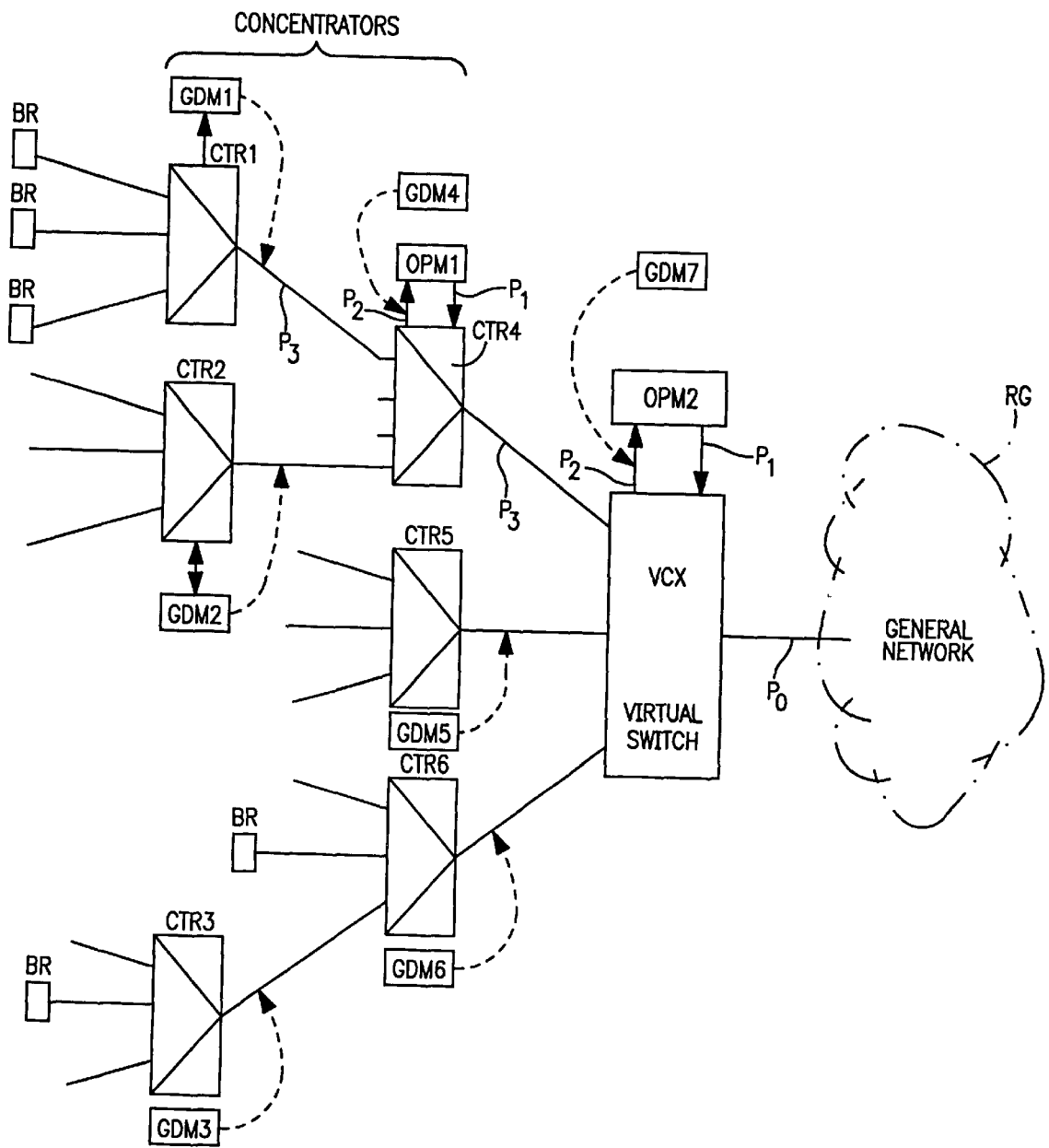

The features of the invention noted above, as well as others, shall become clearer on reading the following description of an example of an embodiment of the invention with reference to the attached drawings, in which:

FIG. 1 is a synoptic view of a simplified mobile access network,

FIGS. 2a and 2b are views of the network of FIG. 1 in which the ascending flow and the descending flow are shown, respectively, in a hand-over phase, FIG. 3 is a partial view of a mobile access network showing the operation of the resource management devices according to the invention, and FIG. 4 is a partial view of a mobile access network showing the layout of the resource management devices according to the invention.

In FIG. 3, three concentration stages CTR, VCX1, VCX2 are shown which form part of a mobile access network RLAM of the same type as in FIG. 1. Said states are composed of a concentrator CTR and two switches VCX1 and VCX2 and are equipped with flow rate management devices GDM1, GDM2 and GDM3, respectively. Each device GDM is provided for managing the resources on the multiplex located directly above the concentration stage which it equips. This function is indicated by arrows A, Thus, the device GDM1 manages the multiplex MX1 and the device GDM2 manages the multiplex MX2. With respect to the device GDM3, it manages the multiplex P2 which links the switch VCX2 with the input of the macrodiversity equipment OPM.

Each device GDM is equipped with a memory which totals the resources consumed on the controlled multiplex, i.e. not only the flow rates consumed by the communications when they are in a hand-over phase but also the other communications which pass through this multiplex.

A receiving terminal BRa is also shown in FIG. 3 which is the network RLAM terminal in question under the coverage of which a mobile unit MB, already connected with another network terminal (not shown), passes.

At the start of a hand-over phase, i.e. at the moment when said mobile unit passes under the coverage area of the terminal BRa, a request for availablity of resources is transmitted by the or each receiving terminal BRa in direction of the concentration stage device GDM1 further downstream, i.e. from the concentrator CTR to which terminal BRa is linked.

In a first embodiment, this request contains only an indicator so that the mere fact of its arrival suffices for the device GDM in question to take into account the request for a flow rate which is fixed in advance, for example 32 Kbits/s. In this case, it is in fact considered that all connections always have the same standard flow rate.

In another embodiment, the request transmitted by the receiving terminal BRa also contains a request for allocation of a flow rate corresponding explicitly to the value of the flow rate which is required for the connection. In this case, communications having different flow rates are considered.

It is specified that the routing of different requests transmitted between terminals and devices GDM are carried out on permanent channels pre-established when putting the ATM network into service.

When it receives a request coming from a receiving terminal BRa, a flow rate management device GDM takes it into account.

If the available resource on the multiplex controlled by said device GM is sufficient for supporting the new required connection resulting from the hand-over, the device GDM transmits the same request to the concentration stage device GDM directly above. For example, in FIG. 3, the device GDM1 transmits the request indicated by the arrows marked M to the device GDM2 which equips the switch VCX1 where it will be analyzed. The procedure is continued until the message M reaches the concentration stage which comprises the macrodiversity equipment OPM which, in the example of FIG. 3, is the switch VCX2.

It will be noted that, above the concentration stage furnished with the macrodiversity equipment OPM, there is no further overload problem for the multiplexes during the hand-over phase and that the above-described procedure will consequently be unnecessary there.

It will be remembered that the macrodiversity server equipment OPM, as noted in the introduction to this description, filters the different flows coming from a same mobile unit and only retains one which is then retransmitted to the switch VCX2.

If the available resource on the multiplex P2 in direction of this equipment OPM is sufficient, the resource management device GDM (in this case GDM2) linked to the switch VCX (in this case VCX2) transmits, in return, a message Mr to all of the concentration stages CTR, VCX1 downstream therefrom in direction of the receiving terminal BRa in question in order to mark, in each of said stages, the connection of this terminal BRa. After marking, the connection between the receiving terminal BRa and the switch VCX2 is made and the hand-over phase can commence.

It will be noted that the part of the network in FIG. 3 is an example and that, in general, a part of the network between a terminal BR and a concentration stage equipped with a macrodiversity equipment OPM can comprise a different number of concentrators CTR and switches VCX. It will again be noted that a concentration stage of this type can be a concentrator CTR or even a virtual circuit switch VCX.

By implementing this procedure, one is certain that the network is capable of circulating the overload resulting from this new connection without risk of overflow of the hold lines of the concentration stages CTR, VCX.

When the hand-over phase is completed, the mobile unit is disconnected from one of the two terminals (either the receiving terminal BRa, or the previous terminal). The latter transmits to each concentration stage in question, by the connection, a message that the connection is free to delete the marking of this connection in said stage. This message is also transmitted, at the level of each concentration stage, to the associated device GDM which frees the flow rate reserved by deducting the value of this flow rate from its memory.

On the other hand, if the available resource is insufficient on one of the multiplexes MX1, MX2, P2 between the receiving terminal BRa and the equipment OPM, the device GDM which first detected this insufficiency responds negatively to the request M transmitted by the receiving terminal. The marking in the concentration stage of the connection on the new terminal BRa is then refused and the hand-over phase is not carried out.

When a connection is established at the level of a concentration stage, the flow rate requested is added to the contents of the memory of the management device GDM linked to said point of concentration. When a connection is released at the start of a hand-over phase, the value of the flow rate which it supported is subtracted from the value of the contents of the memory of the device GDM, as mentioned above.

This memory contains a value which is the charge image of the multiplex monitored. It also takes into account the flow rates consumed by the communications when they are not in a hand-over phase. Thus, it is not only updated during the hand-over phase, as explained above, but also during the establishment and release phases of all communications which pass through the controlled multiplex. This updating is, for example, carried out by transmission, either directly by the call processing unit of the network in question, or by the terminals BR at the start and end of the calls, by appropriate messages on a pre-established permanent channel.

It will be noted that, in the above, the network RLAM was considered to comprise only a single macrodiversity server equipment OPM which is linked to the main switch VCX of the network, i.e. to the switch which comprises a multiplex P0 directed to the outside of the access network. This is, for example, the case in the networks which are shown in FIGS. 1 to 3.

According to a variation of the embodiment of a network according to the invention, other concentration stages, such as network concentrators, are equipped with macrodiversity server equipment OPM. Each macrodiversity server OPM only carries out the filtration of the flow emanating from the terminals BR connected to the concentration stage in question. In this case, only the "local" hand-over situations are processed at the concentration stage CTR in question, i.e. those resulting from mobile units covered by the terminals BR which are connected there.

This situation is shown on the access network of FIG. 4 which comprises six concentrators CTR1 to CTR6 and a switch VCX. The concentrators CTR1 and CTR2 are linked to the concentrator CTR4 which is linked to the switch VCX. The concentrator CTR3 is linked to the concentrator CTR6 which is linked to the switch VCX. Finally, the concentrator CTR5 is linked to the switch VCX. All of the concentrators CTR1 to CTR6 are equipped with management devices GDM1 to GDM6, respectively. The switch VCX is also equipped with such a device GDM7. The concentrator CTR4 is equipped with macrodiversity equipment OPM1 and it is the same tor the switch VCX for the equipment OPM2.

As can be seen in FIG. 4, the management device GDM of the concentration stages which are equipped with OPM equipment monitors the multiplex at the input of the OPM equipment and not the multiplex at the output of the concentration stage. For example, the management device GDM4 monitors the multiplex at the input of the OPM4 equipment and not the multiplex at the output of the concentrator CTR4.

As can also be seen in FIG. 4, the presence of a macrodiversity unit OPM (in the present case OPM2) connected to the switch VCX is required for filtering the hand-over communications which do not pass through the common multiplexes between the terminals BR and concentrator VCX. Thus, it is e.g. a communication of a terminal connected to the concentrator CTR1 and a communication of a terminal connected to the concentrator CTR3.

It is also necessary to filter the hand-over communications which, although having a common multiplexe, have not as yet been filtered by other macrodiversity equipment.

Thus, for example, it is a communication of a terminal connected to the concentrator CTR3 and a terminal connected to the concentrator CTR6.

At the level of a concentration stage which is equipped with a macrodiversity server equipment OPM, the resource management device GDM controls the multiplex at the input of this OPM equipment.

It can be seen in FIG. 2a that, in the ascending direction, each concentration stage (switch VCX, concentrator CTR) in question by the flow generated by a mobile unit when it is in a hand-over phase, receives all of the flow coming from the terminals BR at the same time involved in the hand-over phase from the mobile unit and connects, via the terminals BR themselves or via the downstream concentration stages, to the actual concentration stage. The transmitted flow is the sum of these incidental flows.

It can be seen in FIG. 2b that, in the descending direction, each concentration stage (concentrator CTR or switch VCX), which makes it possible to reach one or more terminals in question by the hand-over of the mobile unit, only receives the flow directed to the mobile unit once. The concentration stage then transmits this same flow according to the conventional ATM transmission process only once to each terminal or downstream concentration stage in question by the hand-over of the mobile.

It one makes the simplifying assumption that the peak flow rate for each directed connection is equal to d, it can be seen that, for each multiplex of the network RLAM, the flow rate of the ascending traffic is greater than or equal to that of the descending traffic.

In fact, at the level or multiplex P4 which links a terminal to its concentrator, the peak ascending flow rate of a mobile unit is equal to the descending peak flow rate of the same mobile unit. On the other hand, for all multiplexes situated above a concentration stage, there are two possible alternatives. If said concentration point is only affected by a single terminal involved in the hand-over phase of the mobile unit, as is the case for the concentrator CTR2 of FIGS. 2a and 2b, the peak ascending flow rate of a mobile unit is equal to the peak descending flow rate of this same mobile unit. On the other hand, if said concentration stage is affected by more than of the terminals involved in the hand-over phase of the mobile unit, as is the case for the concentrator CTR1 in FIGS. 2a and 2b, the peak ascending flow rate of a mobile unit is strictly greater than the peak descending flow rate of this same mobile unit.

It can then be seen that, for each multiplex of the network, the sum of the flow rates of the ascending flow through the multiplex is greater than or equal to that of the descending flow. It can be inferred therefrom that it suffices for each multiplex ATM to have sufficient resources in the ascending direction to ensure that they also have it in descending direction. The ascending direction being the more critical one, we will therefore be essentially interested in the ascending direction for the resource management.

Only the flow rate of communications with the outside of the access network RLAM is found on the multiplex P0. The charges are generated by the switch VCX during the call establishment phases. The switch VCX totals the flow rates required by the connections and refuses the new calls when the flow rate on the multiplex P0 has attained a value corresponding to its maximum capacity. It will be remembered that only the connections from the user point of view going out of the access network RLAM or entering the access network pass through this multiplex. The flow rate consumed for each communication direction is equal to (S×d), where S is the number of outgoing connections and d is the peak flow rate of a connection. At this level, the macrodiversity having been carried out, the charge does not vary during the hand-over phases. The resource management on P0 does not create any difficulty since it is, in fact, resolved by the switch VCX.

On multiplex P4, the traffic is limited by the transfer capacities of the radio channels and, in this case also, the resource management on this multiplex does not pose any particular problem. It is therefore sufficient to dimension the multiplex P4 for the maximum capacity offered by the radio supports.

As for the multiplex P0, the charges on multiplex P1 are managed by switch VCX during the call establishment phases.

The switch VCX totals the flow rates required by the connections and refuses the new calls when the flow rate on the multiplex P1 attains the maximum capacity. At this level, the macrodiversity operation having been carried out, the charge does not vary during the hand-over phases. The resource management on P1 does not create any difficulty since it is resolved by the switch VCX.

On the multiplex P2, the busy rate varies in accordance with the hand-over phases. Strong fluctuations are found here, the lengths of which depend on the duration of the hand-over phases. First of all, an "out of hand-over" is considered. The busy rate on multiplexer P2 is equal to that of multiplex P1. We shall now consider a hand-over situation. This is the case of the normal operation of the access network RLAM. Before the user traffic flow of a mobile unit migrates from a terminal BR to another terminal BR, the ascending flow rates of the terminals BR to the switch VCX are multiplied by b so that the corresponding flows have not crossed the macrodiversity equipment OPM. These overloads are added on multiplex P2 and can lead to overflows and losses, if the multiplex P2 already has a significant load. These fluctuations are absolutely unpredictable and cannot be managed by the switch VCX which does not have a view of the activity of the network RLAM measured in terms of hand-over procedures.

In this reasoning, the assumption is made that radio resources are always available and do not hinder hand-over phases. This also means that the radio channels of a terminal BR cannot be used in their entirety to establish calls.

On multiplex P3, the problem is, to a lesser degree, the one posed with respect to multiplex P2. From the fact that the multiplex P3 is at the outlet of a first flow concentration point, in this case at the outlet of concentrator CTR, only a part of the ascending flow to the multiplex P2 crosses multiplex P3.

It will be noted that, in a more complex architecture with several levels of concentrators, the problem described with respect to multiplex P2 could appear on several interfaces.

Thus, in the simple standard network model considered, the bottlenecks where there is a risk of a decrease in the quality of consecutive service at an overload is the multiplex P3 between a concentrator CTR and the switch VCX and the multiplex P2 between the switch VCX and the macrodiversity server equipment OPM. Thus, the flow rate control device should be placed at these interfaces.

What is claimed is:

1. A mobile access network comprising a number of radio terminals (BR), a plurality of concentration stages (CTR, VCX), a virtual circuit switch (VCX), said radio terminals being connected via at least one of said concentrator stages to another of said concentration stages comprised of said virtual circuit switch (VCX), macrodiversity management equipment (OPM), at least said concentration stages comprised of said virtual circuit switch (VCX) being equipped with said macrodiversity management equipment (OPM), flow rate management means, and each concentration stage (CTR, VCX) downstream from the concentration stage (CTR, VCX) equipped with a macrodiversity management equipment (OPM) being associated with said flow rate management means (GDM) for managing resources on a multiplex connection (MX) which is associated directly with the concentration stage which said flow rate management means equips.

2. A mobile access network comprising: a plurality of concentration stages interconnected by a multiplex;

a number of radio terminals connected via one of said concentration stages to another concentration stage formed by a virtual circuit switch; macrodiversity management means which filters communications from a mobile phone through at least two radio terminals, said mobile phone being located in an area under the radio coverage of said at least two radio terminals, wherein: (a) at least the other concentration stage including the virtual circuit switch is equipped with said macrodiversity management means, and (b) each of said concentration stages downstream from the concentration stage equipped with said macrodiversity management means is equipped with a management device for managing the resources on the multiplex which is located directly upstream from the concentration stage which said macrodiversity management means equips, said managing of the resources on the multiplex being responsive to an arrival of a mobile phone already in communication and upon a request of the radio terminal serving the mobile phone that has just arrived.

3. A mobile access network according to claim 2 further comprising means involved in each management device (GDM) for controlling a data flow rate on the multiplex which is associated with the concentration stage which said management device equips, and means responsive to one of said multiplex being unable to support the flow rate requested for a new connection of a communication in a hand-over phase for instructing said network not to establish said connection.

4. A mobile access network according to claim 2 further comprising means in a receiving terminal (BR) having a coverage in which a mobile unit which is macrodiversity management means, and (b) each of said concentration stages downstream from the concentration stage equipped with said macrodiversity management means is equipped with a management device for managing the resources on the multiplex which is located directly upstream from the concentration stage which said macrodiversity management means equips, said managing of the resources on the multiplex being responsive to an arrival of a mobile phone already in communication and upon a request of the radio terminal serving the mobile phone that has just arrived.

5. A mobile access network according to claim 4, wherein the management device (GDM) of the concentration state is equipped with a macrodiversity management means (OPM), a new message for marking said new connection in said stages to the concentration stages downstream therefrom in a direction of said receiving terminal (Bra), when the multiplex controlled by said management device (GDM) can support the flow rate requested for said new connection.

6. A mobile access network according to one of the claims 4 or 5 wherein said message also contains an allocation request for a flow rate.

7. A mobile access network according to one of the claims 3–5 wherein the management device (GDM) which equips the concentration stage that is also equipped with the macrodiversity management means (OPM) controls the flow rates on the multiplex which links said concentration stage to said macrodiversity management means (OPM).

8. A mobile access network according to claim 2 wherein each resource management device (GDM) comprises a memory in which the value of the flow rate supported by the monitored multiplex is stored and updated.

9. A mobile access network according to claim 8, wherein call processing equipment of said network participates in said updating of the memory of each resource management device (GDM).

10. A mobile access network according to claim 2 wherein each resource management device (GDM) monitors only the flow rate of the multiplex in an upstream direction.

11. A mobile access network according to claim 6 wherein the management device (GDM) which equips the concentration stage that is also equipped with the macrodiversity management means (OPM) controls the flow rates on the multiplex which links said concentration stage to said macrodiversity management means (OPM).

* * * * *